(12) United States Patent
Cumings et al.

(10) Patent No.: US 12,239,107 B2
(45) Date of Patent: Mar. 4, 2025

(54) EMF SHIELD FOR BEEHIVES

(71) Applicants: Robert C. Cumings, Perry, IL (US); James F. Gibson, Edwards, IL (US)

(72) Inventors: Robert C. Cumings, Perry, MO (US); James F. Gibson, Edwards, IL (US)

(73) Assignee: Save The Bees, LLC, Monroe City, MO (US)

( * ) Notice: Subject to any disclaimer, the term of this patent is extended or adjusted under 35 U.S.C. 154(b) by 0 days.

(21) Appl. No.: 18/099,873

(22) Filed: Jan. 20, 2023

(65) Prior Publication Data

US 2023/0225297 A1    Jul. 20, 2023

Related U.S. Application Data

(60) Provisional application No. 63/440,341, filed on Jan. 20, 2023, provisional application No. 63/301,366, filed on Jan. 20, 2022.

(51) Int. Cl.
  *A01K 47/00* (2006.01)
  *A01K 47/06* (2006.01)

(52) U.S. Cl.
  CPC .................................. *A01K 47/06* (2013.01)

(58) Field of Classification Search
  CPC ......... A01K 47/00; A01K 47/06; A01K 49/00
  See application file for complete search history.

(56) References Cited

U.S. PATENT DOCUMENTS 3,704,471 A * 12/1972 Bielby ................... A01K 47/00
  6/2
2010/0022161 A1* 1/2010 Shtatnov ................ A01K 47/06
  449/1

\* cited by examiner

*Primary Examiner* — Joshua J Michener
*Assistant Examiner* — Henry Hooper Mudd
(74) *Attorney, Agent, or Firm* — Robinson & Cole LLP

(57) ABSTRACT

A bee hive apparatus with EMF shielding that increases the comfort and health of the bee colony by blocking EMF transmissions incident on the bee hive apparatus.

18 Claims, 3 Drawing Sheets

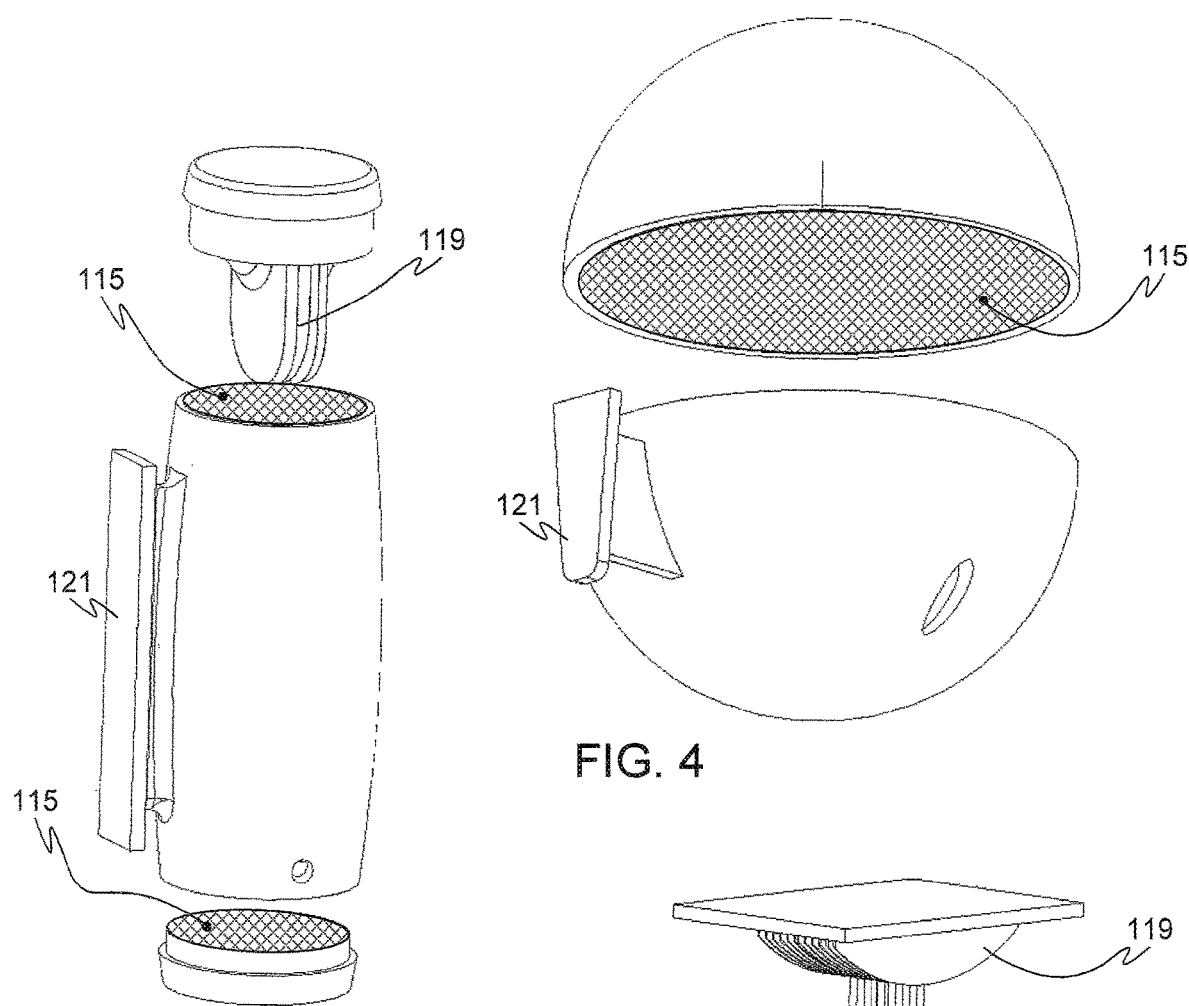
FIG. 3
FIG. 4
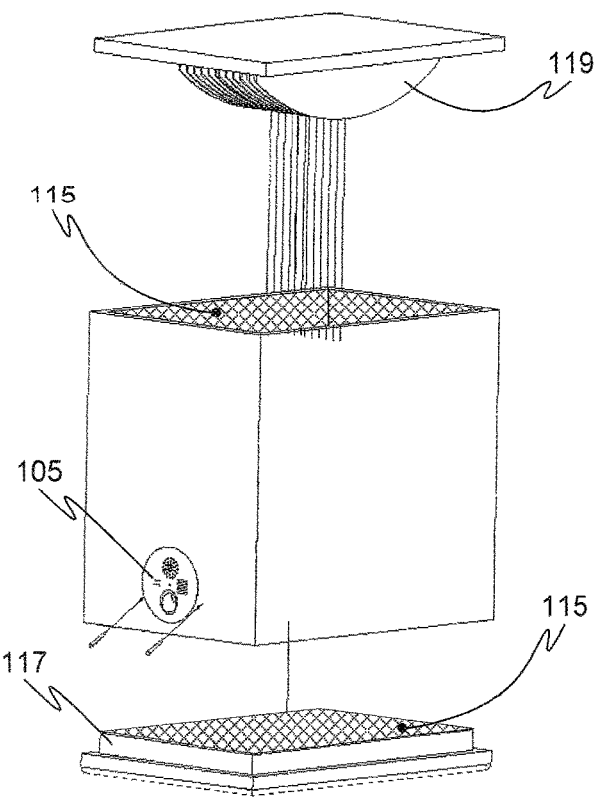
FIG. 5

EMF SHIELD FOR BEEHIVES

CROSS-REFERENCE TO RELATED APPLICATIONS

The present application claims priority from, and incorporates by reference in its entirety, U.S. provisional patent application 63/301,366 filed Jan. 20, 2022. The present application claims priority from, and incorporates by reference in its entirety, U.S. provisional patent application 63/440,341 filed Jan. 20, 2023.

BACKGROUND

Field of the Invention

Various embodiments of the present invention relate to beekeeping equipment and methods, and more specifically, to apparatus for protecting bees from harmful conditions.

Description of Related Art

*Apis mellifera*—that is, honey bees (sometimes written as one word, "honeybees")—serve a critical function in pollinating crops, flowers and other plants. Although they are important to the agriculture sector and the plant world in general, honey bees are subject to a number of environmental hazards and irritants including, for example, insect parasites, rodent and insect predators and agricultural chemicals. Beekeepers strive to ensure the health and productivity of their bee colonies. Beekeepers often use hives designed to avoid hazards and irritants that endanger their bee colonies. Despite their best efforts, beekeepers often experience losses due to unhealthy conditions in bee colonies.

SUMMARY

The present inventors recognized certain hazards to bees that are not addressed in conventional beehives. Embodiments disclosed herein address the above stated needs by providing systems and methods for a bee hive apparatus with EMF shielding. The bee hive apparatus has four side panels including a front panel, two side panels and a back panel. The bee hive apparatus also has a bottom panel and a top cover. The bee hive apparatus also includes one or more entrance holes positioned on the front panel, and entrance gate plates covering each of the entrance holes. The EMF shielding material affixed to the bee hive apparatus blocks at least 90% of EMF transmissions incident on the bee hive apparatus.

BRIEF DESCRIPTION OF THE DRAWINGS

The accompanying drawings, which are incorporated in and constitute part of the specification, illustrate various embodiments of the invention. Together with the general description, the drawings serve to explain the principles of the invention. In the drawings:

FIG. 3 depicts an oblique view of a barrel shaped bee box according to various embodiments.

FIG. 4 depicts an oblique view of a spherical bee box according to various embodiments.

FIG. 5 depicts a larger sized bee box with a removable bottom according to various embodiments.

DETAILED DESCRIPTION

The present inventors recognized the sensitivity of honey bees to electromotive force (EMF) transmissions—e.g., radio waves. The EMF transmissions include, for example, television signals, AM and FM radio signals and cellular telephone signals. The EMF transmissions disturb honey bees, reducing their hive comfort and diminishing their everyday hive activities and honey making abilities. Various embodiments disclosed herein shield the honey bees from harmful EMF transmissions by integrating Faraday cage technology into their hives. The use of this type of housing/bee hive blocks nearly all EMF transmissions from getting into the hive. With EMF transmissions blocked, bees rest better, become more healthy, productive and can better defend the colony against mites and hive beetles. These improved living conditions tend enhance the survivability of the colony and production of honey.

It has become common knowledge and a great concern in the agricultural community that the honey bee population is on the decline. There are a multitude of reasons for this. The present inventors recognized that one reason for the decline in the bee population is due to the growing influence of EMF transmissions. The various embodiments disclosed herein are drawn to methods and systems of beekeeping including constructing and maintaining beehives and modifying beehives to protect bees from harmful EMF emissions.

Historically, a typical new home for bees in the wild would be in a dying tree where a large hollow cavity has already been formed from decay. As the colony grows their home tends to become more vulnerable to storm damage. Studies have concluded that up to 80% of all new spring and summer swarms can perish over the first winter. The various embodiments are advantageous inasmuch as they provide a new and purposefully built unique hives/homes that optimize bee performance and productivity. The various embodiments include features and characteristics that aid in the attraction and maintenance of honey bee swarms. These features include a scent lure, cavity space, Faraday cage, proper size and location of the entrance, proper ventilation and insulation, and the ability to close off entrance for mobile use. Hive boxes built with these features provide the flexibility to manage and maintain productive, healthy honey bees.

Figure 1A:
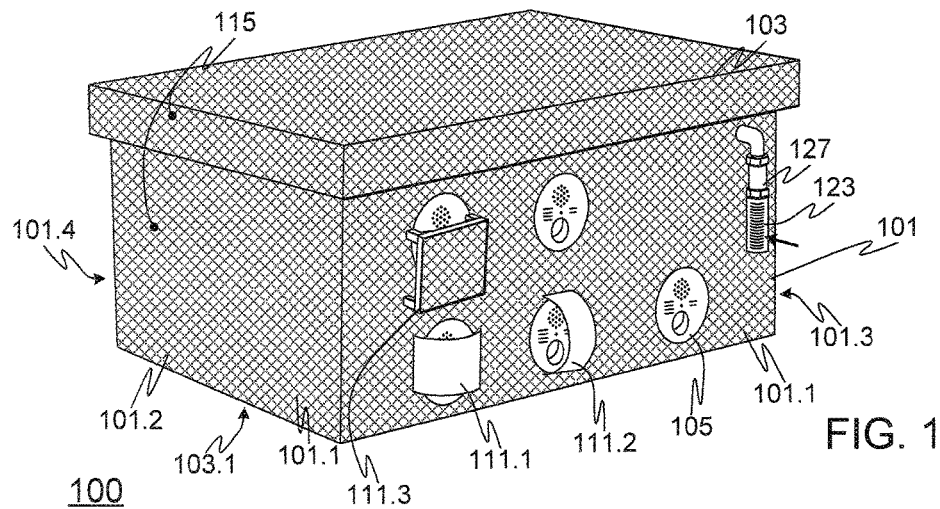
FIGS. 1A-B are oblique views depicting two bee boxes according to various embodiments.
Figure 1C:
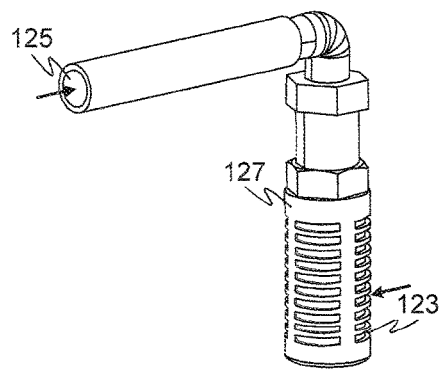
FIG. 1C is an oblique view depicting a ventrapolator according to various embodiments.
Figure 1B:
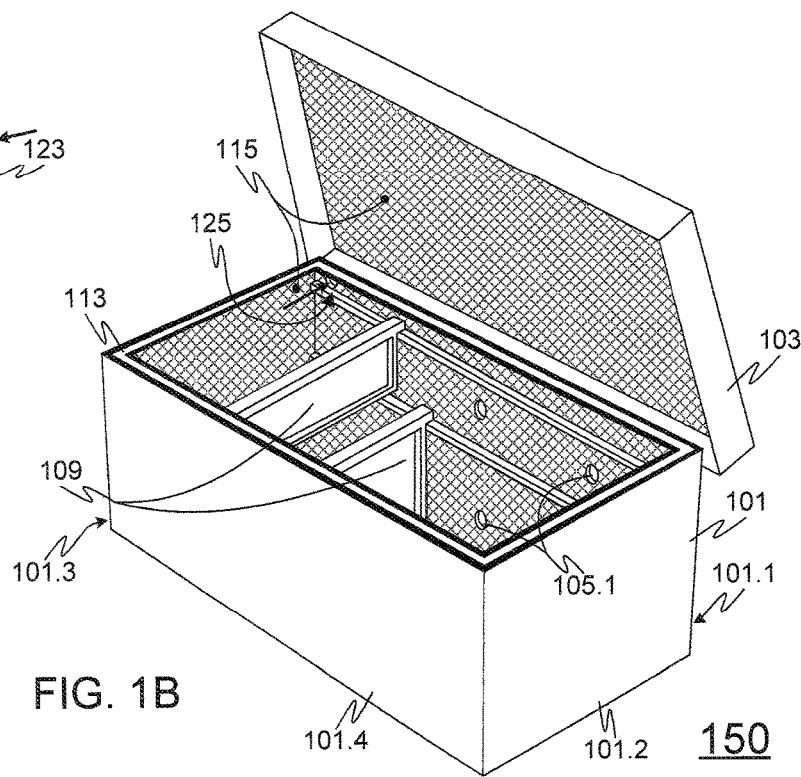

FIGS. 1A-B depict oblique views of two bee boxes according to various embodiments. These two hive box designs promote bee health and optimize honey production. One key attribute of the hive boxes is EMF shielding (e.g., Faraday Cage). The EMF shielding provides protection to the bees inside the hive from EMF transmissions. EMF shielding can be accomplished by various methods including, but not limited to, wire screening, sheet metal, metal foil, conductive material mixed into the plastic, conductive material applied to the surface, or conductive material embedded in foam insulation.

The shielded bee hive structures 100 and 150 are each bee hive apparatuses that include a honey box 101 and a top cover 103. A bee hive apparatus such as shielded bee hive structures 100 and 150 has side panels 101.2 and 101.3, a front panel 101.1 and a back panel 101.4, as well as a top cover 103 and a bottom panel 103.1. (Sometimes the side panels 101.1-4 are simply called sides, the bottom panel 103.1 is called a bottom, and top cover 103 is called a top panel.) The side panels 101.2 and 101.3, front panel 101.1 and back panel 101.4 are depicted in FIGS. 1A and B as being flat. In some embodiments the panels may not be flat. For example, in some embodiments one or more of the panels is curved, bowed outward, or contoured in a shape other than flat. The top cover 103 may be removable as shown in FIG. 1A or may be affixed with hinges so that it opens up but can only be removed by removing the hinges or the hinge pins. The top cover 103 is typically screwed in place with screws (and still considered removable) or secured with one or more latches or hasps to prevent access by predators such as bears, skunks, racoons, opossums or other predators.

The shape of top cover 103 typically matches the shape of the top edges of the as viewed from above so that the top cover 103 fits onto the top edges of the sides. The top cover 103 in FIGS. 1A-B is rectangular in shape. Bee hive apparatuses with top covers that are square in shape are also common too. In some embodiments the top cover may be triangular, five sided, six sided, etc., depending upon the requirements of the implementation and the preferences of the builder or customer. Some top covers may have additional structure built on top—for example, a sloped roof section that helps to drain rain and moisture off the beehive.

The shielded bee hive structures 100 and 150 each have a ventrapolator 127 to capture hive beetles and direct them outside the shielded bee hive structure. Details of one embodiment of the ventrapolator 127 are depicted in FIG. 1C. Hive beetles—sometimes called small hive beetle (*Aethina tumida*)—are a pest that can infiltrate hives and damage combs, stored honey and pollen. The bees tend to herd hive beetles into a corner, keeping them away from areas where they can do damage. The ventrapolator 127 may be positioned near a corner of the hive structure 100/150, in a location where bees will tend to heard the hive beetles. With a ventrapolator 127 installed in a hive structures the bees soon learn to herd the hive beetles towards the ventrapolator entrance 125. The bees prevent them from coming back into the hive. Once the hive beetles enter the ventrapolator 127, they proceed along the tube to the outside of the hive structure 100/150. The ventrapolator 127 has slots 123 or holes which a beetle can fit through but are too small for a bee. This prevents bees from using the ventrapolator 127 as a hive entrance.

Shielded bee hive structure 100 is an externally shielded bee hive with a layer of EMF shield material 115 affixed to the outside of honey box 101 and top cover 103. Shielded bee hive structure 150 is an internally shielded bee hive with a layer of EMF shielding material 115 affixed to the inside of honey box 101 and top cover 103. Other embodiments described below feature EMF shielding embedded within the walls of the bee hive. The EMF shielding does not necessarily need to be all located on the outside, on the inside, or embedded within the walls. Some implementations may mix and match the location of the EMF shielding material 115. For example, some implementations may have EMF shielding material 115 located on the outside of a portion of the hive, with other portions of the hive are EMF shielded on the inside.

Bee hives are often built from modular components. For example, the honey box 101 may include one or more honey super sections (often called "supers") where the bees build hives to store their honey, and a brood section or brood box where the queen bee lays her eggs. FIG. 5 depicts a bee hive apparatus with supers 102 and 104. The honey super sections may be separated by a queen excluder plate that keeps the queen in the brood section but allows other bees to pass back and forth between the sections to care for the queen and her eggs. Frames 109 are typically suspended from brackets or shelves affixed to the inside walls of the honey box 101 or the honey super section(s) if the honey box 101 is configure with them.

FIG. 1A has entrance gate plates 105 positioned on the front side 101.1 that allow the bees to come and go from the hive through entrance holes 105.1. The entrance holes 105.1 can be seen from the inside in FIG. 1B. On some embodiments one or more entrance gate plates 105 may be positioned on the sides 101.1-2, the back side 101.4, or even the top cover 103. The bees can come and go freely in and out of the bee hive apparatus with the entrance gate plates 105 set in the open position. The entrance gate plates 105 can be rotated by the beekeeper to a closed position to cover the entrance holes 105.1 to lock the bees inside. This allows the hive to be moved from one location to another, and is useful when other beekeeping maintenance activities are performed. The entrance holes 107 drilled through the walls of the honey box 101 can be seen in FIG. 1B. EMF shields 111.1, 111.2 and 111.3 help to shield the entrance holes 107 from EMF transmissions. Vertical EMF shield 111.1 allows bees to fly in from the bottom or top to behind the shield where they can then enter the entrance hole 107. Horizontal EMF shield 111.2 allows bees to fly in from either side to enter the entrance hole 107. Plate EMF shield 111.3 has spaces on all sides, allowing the bees to enter from any direction. Each of the EMF shields 111.1, 111.2 and 111.3 blocks line of sight EMF transmissions into the entrance hole 107 it covers.

Some of the various embodiments have a layer of insulation 113 built into the honey box 101. The top cover 103 may also include a layer of insulation 113 embedded within the top panel of top cover 103. The insulation helps keep the hive warmer in the winter and cooler in the summer, increasing the comfort of the hive. As such, the insulation 113 facilitates bee survival rates through the winter in cold winter locales by keeping the hive population warmer. The insulation 113 also promotes optimized honey production in the summer by making the hive boxes cooler in the summer heat. Some embodiments have EMF shielding 115 embedded within the insulation layer 113. In other embodiments the EMF shielding 115 is located within the walls of the honey box 103 and/or top cover 103, positioned in parallel with the insulation layer 113.

Figure 2:
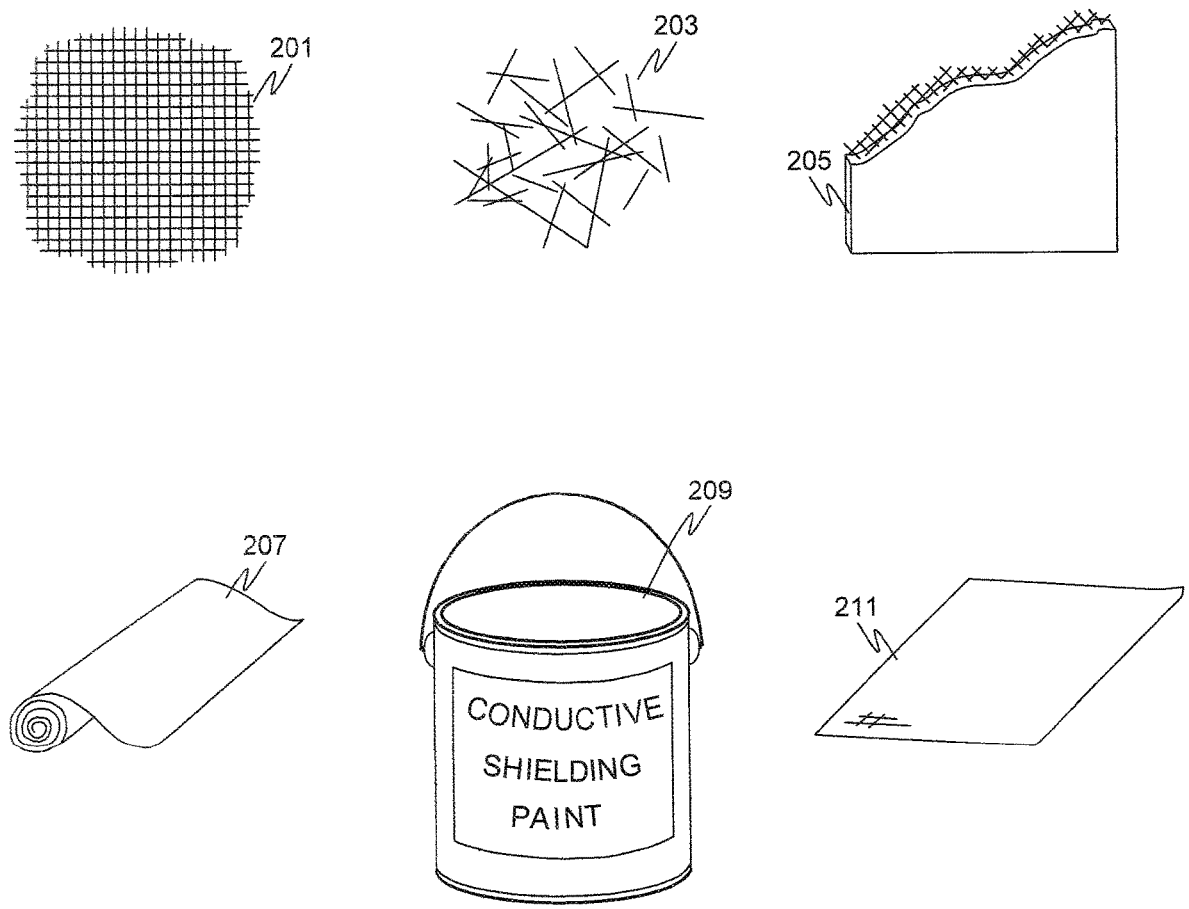
FIG. 2 depicts different types of EMF shielding materials according to various embodiments.

FIG. 2 depicts some different types of EMF shielding materials according to various embodiments. EMF shielding (e.g., Faraday cage) provides protection to the bees while inside the hive. This can be accomplished by various methods using a number of materials including, but not limited to, wire screening 201, chaff material 203, shielding insulation 205, metal foil 207, conductive shielding paint 209, sheet metal 211, or other conductive materials known to those of ordinary skill in the art. In high EMF saturated areas a special entrance configuration such as EMF shields 111.1, 111.2 and 111.3 of FIG. 1A can be useful for total shielding. This can be through "vaning" or tunneling where the entrance is shielded without a straight path to the inside. Also, shadowing can be very effective whereas multiple layers of shielding material placed at varying locations of wall depth to eliminate the straight path to the inside.

The wire screening 201 may be ordinary metal wire screening as is used on screen doors. It should be noted that more closely spaced wires tend to be better at blocking higher frequency EMF transmissions—the smaller the holes in the screen material the higher the blocked frequencies.

Brass screening or mesh may also be used as wire screening 201. In various embodiments the EMF transmissions blocked by be as low as 50 Hz (e.g., as generated in the power supplies often found in houses) to as high as 30 GHz (e.g., as generated by some radars), or any frequency between these two extremes. Other embodiments may block even higher frequencies, for example, as high as 100 GHz.

Chaff material 203 includes small metal rods, wire, pieces of metal, metal strips or other small pieces of conductive material. The individual pieces of chaff material 203 may include varying lengths of material. The chaff material 203 may be embedded in the layer of insulation 113, may be embedded in a layer for the sole purpose of EMF shielding. The chaff material 203 may also be applied to the shielded bee hive structure with an adhesive, or be mixed into paint and painted on to, or inside of, the structure.

Shielding insulation 205 may be in the form of panels of insulation containing an embedded EMF shielding material. In some embodiments the insulation material is foam insulation. The EMF shielding material may be wire screening such as wire screening 201 as shown in FIG. 2. Alternatively, the embedded shielding material may be small conductive pieces such chaff material 203, or other conductive material mixed in with the insulation material.

The metal foil 207 may be ordinary aluminum foil, tin foil, or thin flexible layers of other metals or conductive material. The metal foil 207 may be formed to the walls of the shielded bee hive structures, then tacked on with nails, glued on or taped on. It may be desirable to use multiple layers of the metal foil 207 since a single thin layer may not always block all EMF transmissions. The sheet metal 211 used as EMF shielding may be thought of as being similar to foil—except sheet metal 211 is not as flexible as metal foil 207. Further, only one layer of sheet metal 211 is typically needed since it tends to be much thicker than metal foil 207.

Another option for EMF shielding is by using conductive shielding paint 209. The paint can be applied to the outside of the bee hive apparatus, to an inner wall (e.g., one of the walls adjacent the insulation layer 113, or to the insulation layer 113 itself.

FIGS. 3-5 depict some of the shapes and sizes the various embodiments of shielded bee hive structures can be implemented in. FIG. 3 depicts a barrel shaped shielded hive structure. Similarly, some hive apparatus may be cylindrically shaped. For the purposes of nomenclature and discussion, the barrel shaped shielded hive structure of FIG. 3, and cylindrical shaped hive structures, are thought to have four sides (sometimes called panels). In the embodiment of FIG. 3 an "X" is drawn (labeled X on the figure), and the sides are divided by the dotted lines drawn downward from the "X". The dotted lines separate the front side 101.1 from sides 101.2 and 101.3, and the back side 101.4. In the embodiment of FIG. 3 the sides are equal sized. In other embodiments the sides may not be of equal size. In the embodiment of FIG. 3 the front side 101.1 contains the entrance hole. Other embodiments may have multiple entrance holes on one or more of the front side 101.1 from sides 101.2 and 101.3, and/or the back side 101.4. In the embodiment of FIG. 3 an attachment mechanism 121 is positioned on side 101.2. In accordance with other embodiments the attachment mechanism 121 may be positioned on the back side 101.4, the other side 101.3, the bottom or even the top of the hive structure.

FIG. 4 depicts a spherical shielded hive structure. FIG. 5 depicts a larger sized shielded bee hive box with a removable bottom 117. The spherical shielded hive structure of FIG. 4, the barrel shaped shielded hive structure of FIG. 3, and a cylindrical shaped shielded hive structures, each have a round cross-section. Some of the various embodiments feature flattened versions of these shapes with an oval cross-section. Both round cross-sections and oval cross-sections, as well as shielded hive structures with panels that are bowed outward, or contoured in a shape other than flat are considered to have "curved line" cross-sections.

The embodiment shown in FIG. 5 is modular, having supers 102 and 104 as well as the removable bottom 117. To increase the size of the hive apparatus more supers can be added to make the bee hive apparatus taller. Each of the different shaped/sized shielded hive structures of FIGS. 3-5 includes EMF shield material 115 as well as the various components of a bee hive structures such as one or more entrance gate plates 105 and/or entrance holes 107.

Another feature of the various embodiments of shielded bee hive structures is the ability to adjust the hive volume. Hive volume can be increased by adding frames, or decreased by removing frames. Moreover, one or more of the entrance gate plates 105 of various embodiments can be opened or closed to increase or decrease hive access. For high density hive boxes with more frames, it is desirable to have more access ports opened since more bees will be coming and going.

Some locations have a number of bee hive structures in close proximity. It promotes the health and productivity of all hives to maintain an unmanaged hive (sometimes called permanent home) together with several managed hives. No honey is harvested from the unmanaged hive, and the bee keeper is careful to minimize disturbances to the unmanaged hive. Some of the embodiments disclosed herein may serve as an unmanaged hive (permanent home) for honey bee swarms. The unmanaged hive embodiments include a modular implementation allowing for quick relocation if convenient or necessary. This mobile aspect is the heart of managing the bees and not the hives, providing them suitable protection from every aspect that contributes to their demise all while working them in what they love to do: pollinate. The various embodiments avoid interfering with the bees, and do not disturb them by drenching them with oxalic acid, adding frames for honey and then ultimately taking most their stores for winter. This, in turn, promotes swarm activities and socialization as nature intended. One aspect of the intended use is to relocate multiple hives into an area requiring a large amount of pollination in a short period of time as the local bee population grows. Another key aspect is the addition of beehives in farms, parks city municipalities, golf courses, vineyards or other locations requiring pollination. The shielded bee hive structures may be installed as permanent additions such locations. The various embodiments allow flexibility in placing the colony where it is needed the most and has the more conducive surroundings for the hive.

Typically, the hive boxes are sized to accommodate readily available hive frames (e.g., Langstroth). However, the dimensions of hive boxes and frames according to the various embodiments can be altered to meet the constraints or requirements of a particular implementation. The design criteria are not limited to any particular cavity form or specific size as the hollow in trees are also not. For demonstration purposes, one particular implementation uses a 60 liter cavity. The embodiments illustrated in FIG. 3 and FIG. 5 include starter foundation panels 119 extending downwards from the top. Additional features include various attachment mechanisms 121 which attach the bee boxes to trees or other structures. One such attachment mechanism is one or more slotted plates fasted to the bee box and sized to accept a bolt head. A bolt is fasted to the tree (or two bolts for dual slotted plates). The slotted plate mounted on the bee box is then pushed onto the bolt, and slid down to removably secure the bee box to the tree.

Some of the elements and characteristics for attracting wild swarms to include, but not limited to, attractant lure (e.g., lemongrass oil) and an apparatus for excreting or otherwise distributing the attractant lure (e.g., capillary tube) over a period of time. Coating the inside with bees wax mixed with charcoal from burnt wood, for a familiar scent. Adequate ventilation that may be adjustable, typically in the upper area of the hive to manage heat and cold. Expandable in size as needed, (e.g., adding segments).

The phrase "EMF transmissions" as used herein includes television signals, AM and FM radio signals, cellular telephone signals, as well as the electronic or magnetic signals, emissions and noise of other electronic equipment of various frequencies and amplitudes as known to those or ordinary skill in the art. The phrase "blocks EMF transmissions" means that most, but not necessarily all EMF transmissions are blocked. The phrase "blocks nearly all EMF transmissions" means blocks at least 85% of EMF transmissions. Some embodiments block at least 85% of EMF transmissions. Other embodiments block at least 90% of EMF transmissions, or at least 95% of EMF transmissions. Yet other embodiments block at least 97% of EMF transmissions, and some embodiments block at least 99% of EMF transmissions. Some embodiments block at least 85% of EMF transmissions at one or more frequencies (or frequency bands) and also block at least 95% of EMF transmissions at other frequencies (or frequency bands). The phrase "EMF transmissions incident on the bee hive apparatus" means EMF transmissions that can be detected hitting the bee hive apparatus. The phrase "block line of sight EMF transmissions" into an entrance hole means to block direct paths (i.e., line of sight, or straight-line paths) of EMF transmissions incident upon the hive structure at an angle perpendicular +/−45 degrees to the panel containing the entrance hole.

The phrase "wire screening" as used herein can either be a screen material made from interwoven conducting wires, or can be a flexible wire mesh such as the mesh use for fireplace screens, or can be thin sheets (e.g., perforated metal less than 0.15 inch thick) of metal with numerous closely spaced (e.g., less than 0.5 inch apart) holes punched or drill through the sheets. "Sheet metal" as this phrase is used herein (e.g., sheet metal 211) includes any type of metal in sheets at least 0.05 inch thick and at least six inches wide by at least six inches long.

A component (e.g., an entrance gate plate 105) that is "rotatably positioned" on an apparatus (e.g., a hive structure side panel) is affixed to the apparatus in a manner that allows the component to be rotated. EMF shielding is "affixed" to a bee hive apparatus may either be fasted to the apparatus or embedded within the apparatus. EMF shielding material that is embedded within a layer of the hive's insulation is considered to be "affixed" bee hive apparatus. EMF shielding paint containing EMF shielding material that is painted onto a bee hive apparatus is considered "affixed". Other types of EMF shielding material (e.g., wire screening 201, chaff material 203, shielding insulation 205, metal foil 207, sheet metal 211, or other conductive materials) that are nailed, stapled, glued taped or otherwise fastened to the bee hive apparatus are considered to be "affixed" bee hive apparatus.

The description of the various embodiments provided above is illustrative in nature inasmuch as it is not intended to limit the invention, its application, or uses. Thus, variations that do not depart from the intents or purposes of the invention are intended to be encompassed by the various embodiments of the present invention. Such variations are not to be regarded as a departure from the intended scope of the present invention.

What is claimed is:

1. A bee hive apparatus with EMF shielding, the apparatus comprising:
   at least three side panels including a front side panel, a first side panel and a second side panel;
   one or more entrance holes positioned on the front side panel;
   a bottom panel;
   a top cover; and
   EMF shielding material affixed to the at least three side panels and the top cover;
   wherein the EMF shielding blocks at least 90% of EMF transmissions incident on the bee hive apparatus;
   wherein the EMF shielding material is wire screening fastened to the bee hive apparatus.

2. The bee hive apparatus of claim 1, wherein the top cover is a removable top cover.

3. The bee hive apparatus of claim 2, further comprising:
   one or more entrance gate plates rotatably affixed to the front side panel and respectively positioned over the one or more entrance holes;
   wherein each of the one or more entrance gate plates can be set in an open position or set in a closed position.

4. The bee hive apparatus of claim 3, further comprising:
   one or more EMF shields, each of the one or more EMF shields being attached to the bee hive apparatus to block line of sight EMF transmissions from entering a respective one of the one or more entrance holes.

5. The bee hive apparatus of claim 1, wherein the at least three side panels is at least four side panels including a back panel.

6. The bee hive apparatus of claim 1, wherein the apparatus has a curved line cross-section.

7. The bee hive apparatus of claim 1, wherein the wire screening is fastened to the outside of the bee hive apparatus.

8. The bee hive apparatus of claim 1, wherein the EMF shielding material is embedded within insulation fastened to the bee hive apparatus.

9. The bee hive apparatus of claim 1, wherein the EMF shielding material is affixed to the bottom panel.

10. The bee hive apparatus of claim 1, wherein the EMF transmissions blocked are as high as 30 GHz.

11. The bee hive apparatus of claim 1, wherein the EMF shielding material blocks at least 95% of EMF transmissions incident on the bee hive apparatus.

12. A method of making a bee hive apparatus with EMF shielding, the method comprising:
    providing at least three side panels including a front side panel affixed a first side panel, the front side panel also being affixed to a second side panel;
    drilling one or more entrance holes on the front side panel;
    affixing a bottom panel to the at least three side panels;
    positioning a top cover on the at least three side panels; and
    affixing EMF shielding material to the at least three side panels and the top cover;
    wherein the EMF shielding blocks at least 90% of EMF transmissions incident on the bee hive apparatus; and
    wherein the EMF shielding material is wire screening fastened to the bee hive apparatus.

13. The method of claim 12, wherein the top cover is a removable top cover.

14. The method of claim 13, wherein the at least three side panels is at least four side panels including a back panel, the method further comprising:
- rotatably affixing one or more entrance gate plates to the front side panel and respectively positioning the one or more entrance gate plates over the one or more entrance holes;
- wherein each of the one or more entrance gate plates can be set in an open position or set in a closed position.

15. The method of claim 12,
wherein the EMF transmissions blocked are as high as 30 GHz.

16. The method of claim 12, further comprising:
attaching one or more EMF shields to block line of sight EMF transmissions from entering a respective one of the one or more entrance holes.

17. The method of claim 12, wherein the EMF shielding material is embedded within insulation fastened to the bee hive apparatus.

18. The method of claim 12, wherein the EMF shielding material is affixed to the bottom panel.

\* \* \* \* \*